United States Patent
Natroshvili et al.

(10) Patent No.: US 9,311,706 B2
(45) Date of Patent: Apr. 12, 2016

(54) SYSTEM FOR CALIBRATING A VISION SYSTEM

(75) Inventors: Koba Natroshvili, Waldbronn (DE); Kay-Ulrich Scholl, Karlsbad (DE); Johannes Quast, Karlsruhe (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 634 days.

(21) Appl. No.: 13/483,565

(22) Filed: May 30, 2012

(65) Prior Publication Data

US 2012/0320190 A1 Dec. 20, 2012

(30) Foreign Application Priority Data

Jun. 1, 2011 (EP) ..................................... 11168355

(51) Int. Cl.
*G06T 7/00* (2006.01)
*G06T 5/00* (2006.01)

(52) U.S. Cl.
CPC ................. *G06T 7/002* (2013.01); *G06T 5/006* (2013.01); *G06T 2207/30208* (2013.01); *G06T 2207/30252* (2013.01)

(58) Field of Classification Search
CPC ........... G01B 11/2755; G01B 2210/12; G01B 2210/26; G01B 2210/303
See application file for complete search history.

(56) References Cited

U.S. PATENT DOCUMENTS

| | | | |
|---|---|---|---|
| 2002/0027651 A1* | 3/2002 | Jackson | G01B 11/2755 356/139.09 |
| 2003/0021490 A1 | 1/2003 | Okamoto et al. | |
| 2008/0231710 A1 | 9/2008 | Asari et al. | |
| 2009/0042173 A1 | 2/2009 | Jaszlics et al. | |
| 2011/0115922 A1* | 5/2011 | Shimizu | G06T 7/0018 348/188 |
| 2012/0148145 A1* | 6/2012 | Liu | G06T 7/0075 382/154 |
| 2012/0285024 A1* | 11/2012 | Miller et al. | 33/1 A |

FOREIGN PATENT DOCUMENTS

| | | |
|---|---|---|
| EP | 1 302 365 A1 | 4/2003 |
| EP | 2 192 552 A1 | 6/2010 |

(Continued)

OTHER PUBLICATIONS

European Search Report for European Patent Application No. 11 003 828.8, 8 pgs., Sep. 22, 2011.

(Continued)

*Primary Examiner* — William C Vaughn, Jr.
*Assistant Examiner* — Jerry Jean Baptiste
(74) *Attorney, Agent, or Firm* — Alleman Hall McCoy Russell & Tuttle LLP

(57) ABSTRACT

A system for calibrating a vision system of an object. For example, a system for calibrating a surround view system of a vehicle. The system may be configured to capture, via a first and second image sensor, a first and second image of a plurality of objects. Upon capturing such information, the system may be configured to determine a position and orientation of the first and the second image sensor relative to the plurality of objects based on the first and the second captured image. Further, the system may be configured to determine a relative position and orientation between the first and the second image sensor based on a result of the determining a position and orientation of the first and the second image sensor. Also, the system may be configured to determine intrinsic and extrinsic parameters of the first and the second image sensor.

22 Claims, 9 Drawing Sheets

(56) References Cited

FOREIGN PATENT DOCUMENTS

| EP | 2 200 311 A1 | 6/2010 |
| EP | 2 234 399 A1 | 9/2010 |
| EP | 2 285 109 A1 | 2/2011 |

OTHER PUBLICATIONS

European Search Report from corresponding European Application No. 11 16 8355, Oct. 27, 2011.

European Search Report from corresponding European Patent Application No. 11172195.7-2218, Dec. 12, 2011.

Extended European Search Report issued in European Patent Application No. 11162470.6, (7 pgs.), dated Aug. 18, 2011.

European Search Report issued in European patent application No. 11176707.5-1523, 6pp., Dec. 29, 2011.

Chen, Y.Y. et al., "An Embedded System for Vehicle Surrounding Monitoring," 2009 2$^{nd}$ International Conference on Power Electronics and Intelligent Transportation System, *IEEE*, Piscataway, NJ, USA, Dec. 19, 2009, XP031624185, pp. 92-95.

Gandhi, Tarak et al., "Vehicle Surround Capture: Survey of Techniques and a Novel omni-Video-Based Approach for Dynamic Panoramic Surround Maps", *IEEE Transactions on Intelligent Transportation Systems*, 2006, vol. 7, No. 3, XP-002659721, pp. 293-308.

Liu, Y.C. et al., "Bird's-Eye View Vision System for Vehicle Surrounding Monitoring," in Robot Vision, Jan. 1, 2008, Springer Berlin Heidelberg, Berlin, Heidelberg, XP55004046, pp. 207-218.

Tsai, Roger Y., "A Versatile Camera Calibration Technique for High-Accuracy 3D Machine Vision Metrology Using Off-The-Shelf TV Cameras and Lenses", *IEEE Journal of Robotics and Automation*, 1987, vol. 3, No. 4, pp. 323-344.

Tsai, Roger Y., "An Efficient and Accurate Camera Calibration Technique for 3D Machine Vision", *Proceedings of IEEE Conference on Computer Vision and Pattern Recognition*, Miami Beach, FL, 1986, pp. 364-374.

Zhang, Z., "A Flexible New Technique for Camera Calibration", *IEEE Transactions on Pattern Analysis and Machine Intelligence*, 2000, vol. 22, No. 11, pp. 1330-1334.

Perdersini F., et al.,"Accurate and Simple Geometric Calibration of Multi-Camera Systems", Signal Processing, Elsevier Science Publishers B.V. Amsterdam, NL, vol. 77, No. 3, pp. 309-334, Sep. 1, 1999.

Forbes et al., "An Inexpensive, Automatic and Accurate Camera Calibration Method", Proceedings of the Thirteenth Annual South African Workshop on Pattern Recognition, 2002.

Stefan Vacek et al., "Road-Marking Analysis for Autonomous Vehicle Guidance", Online Proceedings of the 3rd European Conference on Mobile Robots, pp. 1-9, Sep. 19, 2007.

Douret J. et al., "A Volumetric Multi-Cameras Method Dedicated to Road Intelligent Vehicles Symposium", 2004 IEEE, pp. 442-446, Parma, Italy Jun. 17-17, 2004, Piscataway, NJ, USA IEEE Jun. 14, 2004.

Kunfeng Wang et al., "Research on Lane-Marking Line Based Camera Calibration", Vehicular Electronics and Safety, 2007, ICVES, IEEE International Conference on, IEEE, Piscataway, NJ, pp. 1-6, Dec. 13, 2007.

\* cited by examiner

SYSTEM FOR CALIBRATING A VISION SYSTEM

BACKGROUND OF THE INVENTION

1. Priority Claim

This application claims the benefit of priority from European Patent Application No. 11 168 355.3, filed Jun. 1, 2011, which is incorporated by reference.

2. Technical Field

The present invention relates to calibration of a vision system, such as surround view system.

3. Related Art

For example, in recent years, use of rear and side view cameras for vehicles has been proliferating. Often these cameras are used for driver assistance and can improve vehicle safety. Although, these cameras are known to provide views that typical rear and side view mirrors cannot, they too have blind spots that can be hazardous to the driver and others. In addition to blind spots, these cameras can also be hazardous in that the views that they provide often suggest to the driver of vehicle that there is more space between the vehicle and another object than in reality. Vision systems, such as surround view systems, may remedy some of these concerns.

SUMMARY

Described herein is a calibration system for calibrating a vision system (such as a surround view system) of an object (such as a vehicle). The calibration system may be implemented via calibration logic that may include software, hardware, firmware, or a combination thereof. The vision system may have plurality of cameras, such as cameras having a large lateral opening, such as fisheye lens. The calibration system may be configured to capture, via a first and second image sensor, a first and second image of a plurality of objects. Upon capturing such information, the system may be configured to determine a position and orientation of the first and the second image sensor relative to the plurality of objects based on the first and the second captured image. Further, the system may be configured to determine a relative position and orientation between the first and the second image sensor based on a result of the determining a position and orientation of the first and the second image sensor. Also, the system may be configured to determine intrinsic and extrinsic parameters of the first and the second image sensor.

Other systems, methods, features and advantages will be, or will become, apparent to one with skill in the art upon examination of the following figures and detailed description. It is intended that all such additional systems, methods, features and advantages be included within this description, be within the scope of the invention, and be protected by the following claims.

BRIEF DESCRIPTION OF THE DRAWINGS

The calibration system may be better understood with reference to the following drawings and description. The components in the figures are not necessarily to scale, emphasis instead being placed upon illustrating the principles of the invention. Moreover, in the figures, like referenced numerals designate corresponding parts throughout the different views.

DETAILED DESCRIPTION

1. Overview

Figure 1:
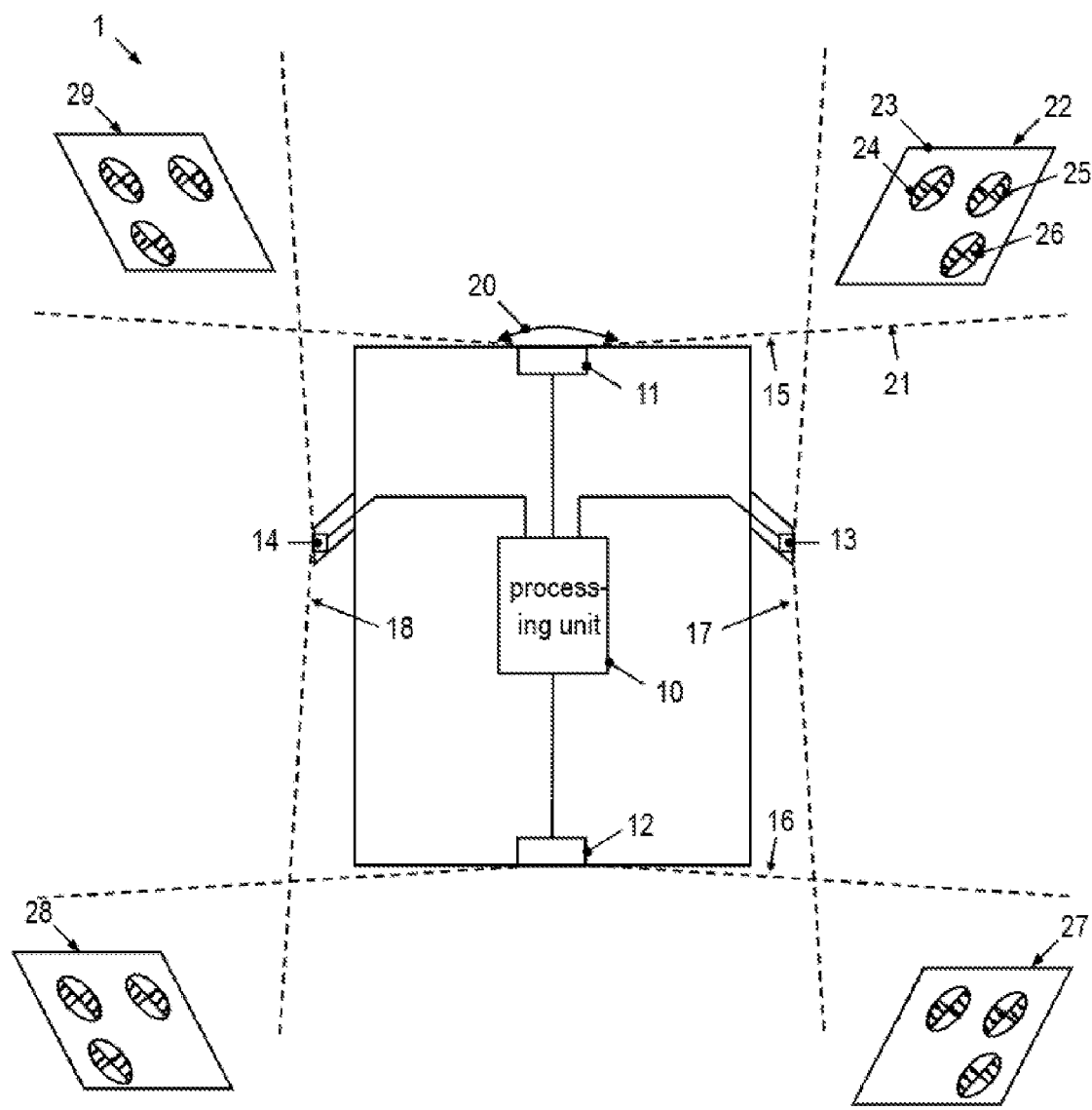
FIG. 1 is a schematic view showing an example vehicle 1.

In a vision system, such as a surround view system, where data captured by different image sensors (e.g., different cameras) are to be combined with each other, typically, parameters related to the sensors should be known. Calibration may be performed to establish extrinsic and intrinsic parameters of each sensor. Approaches for calibration of cameras include techniques using markers positioned in a reference frame of an object hosting a vision system, such as a vehicle, at a position that may be known with precision, such as precision priori. However, such approaches may be less accurate due to error propagation resulting from inaccurate positioning of a marker, for example. Achieving results that are more accurate may depend on more resources, such as more time and more expensive technologies, for example. Other approaches may benefit from tracking other objects in the surroundings of the object relative to the object; however, such approaches may depend on calibration of each camera individually. Still other approaches for calibration of a vision system may include overlapping field of view (FOV) techniques; however, such approaches may also have a tradeoff of depending on a marker positioned with high accuracy at a predetermined position relative to the object. Therefore, a vision system, such as a surround view system, may benefit from calibration that may be independent of a predetermined positioned marker in a host object's frame of reference (this predetermined positioned marker may also be referred to as a priori).

With respect to such a calibration system, the calibration system may be for calibrating a vehicle vision system. The vehicle vision system may include a plurality of image sensors that capture images including non-linear distortion, such as distortion often caused by fisheye lenses. Image sensors (e.g., cameras with fisheye lenses) of the vision system are provided at different locations on or within a vehicle hosting the vision system. A method performed by calibration logic of the calibration system (the logic including software, hardware, firmware, or a combination thereof) may include capturing, determining and establishing steps performed for a pair of image sensors including a first and second camera, for example. In the method, a first image of a plurality of objects in the vehicle's surrounds may be captured using the first camera, and a second image of the plurality of objects may be captured using the second camera, for example. Regarding the plurality of objects, the objects may be located in an overlapping region of field of views of the first and second camera. A position and orientation of the first camera may be determined by the calibration logic based on the first captured image, and a position and orientation of the second camera may be determined by the logic based on the second captured image. The calibration logic may determine a relative position and orientation between the first and second camera based on a result of these two last mentioned determining steps.

Further, the calibration logic may determine a relative position and orientation between image sensors based on images of the plurality of objects positioned in an overlapping region of fields of view (FOVs) of the sensors. The logic may benefit from not depending on known locations of the plurality of objects relative to the vehicle (or priori) in order to determine positioning of the image sensors.

Also, the calibration logic may configure the image sensors so that they capture images having non-linear distortion. This allows the image sensors to be configured with optical components having a wide FOV. A small amount of image sensors, such as four image sensors, may be sufficient to capture a surround view covering a full 360° angular range surrounding an object hosting the vision system, such as a vehicle. An opening angle of the FOV of the image sensors in a lateral direction may be within a range of at least 170° to 175°, for example.

Positions of the plurality of objects relative to each other may be known to the calibration logic. These predetermined relative positions may be used to determine the position and orientation of the image sensors relative to the plurality of objects. The plurality of objects may be markers, such as checkerboard patterns arranged in a trihedral arrangement.

The plurality of objects may be arranged in at least one predetermined arrangement, possibly predetermined by the calibration logic. The plurality of objects may include at least one checkerboard pattern. This allows the calibration logic to determine relative positions between the plurality of objects from a small number of parameters defining the relative positions of the objects. The plurality of objects may be arranged such that the objects are not all located within the same plane, for example. There may be at least one object of the plurality of objects that is positioned away from a plane defined by at least three other objects of the plurality of objects.

The position of an image sensor may refer to the position of a characteristic point of the image sensor. This point may be defined by point where an optical axis intersects an electro-optical sensor or lens, for example. Orientation of an image sensor may refer to an orientation of an image sensor coordinate system in space that may be quantified by three angles. A relative position between two image sensors may be the offset between the characteristic points. A relative orientation may include rotation operations useful to align the image sensor coordinate system of one image sensor to the coordinate system of another image sensor, for example, in the case of two image sensor pairs. Further, there may be perspectives to illustrate relative positions and relative orientations of the objects in the surroundings and the image sensors.

In one aspect, in determining an orientation of an image sensor relative to a coordinate system defined by a plurality of objects in the surroundings of an object hosting the vision system, the calibration logic may not need to compute rotation angles. Instead, a rotation matrix may be determined by the logic. Additionally, the calibration logic may determine relative orientation between image sensors with respect to the rotation matrix; and the logic may determine relative position with respect to translation matrix or translation vector.

The capturing, determining, and establishing mentioned above may be performed for a plurality of pairs of image sensors having overlapping FOVs. Thereby, relative positions and/or relative orientations may be determined by the calibration logic for pairs of image sensors having overlapping FOVs. The determined relative orientation between image sensors may include or represent at least two angles, to provide information related to rotation that may be used by the calibration logic to align an optical axis of an image sensor with an optical axis of another image sensor. Also, the calibration logic may perform capturing, determining, and establishing for the plurality of pairs of image sensors, and information on relative orientation between non-adjacent image sensors may be determined based thereon by the logic. For example, information on at least two angles which define relative orientation between a front camera and a rear camera of a vehicle vision system, which do not have overlapping FOVs, may be determined based on the capturing, determining and establishing steps performed for at least two pairs of image sensors. The information on the at least two angles, which define the relative orientation between the front camera and the rear camera, may be attained with enhanced accuracy by the calibration logic performing the capturing, determining and establishing steps for at least four pairs of image sensors, for example. Further, information on relative orientation between left and right cameras of the vehicle vision system can be obtained by performing the capturing, determining and establishing steps for at least two pairs of image sensors, for example. By the calibration performing the capturing, determining and establishing steps for at least four pairs of image sensors, consistency checks may be performed to determine the relative orientation of non-adjacent image sensors.

A pair of the plurality of pairs may include a first image sensor and an intermediate image sensor. Another pair of the plurality of pairs may include the intermediate image sensor and a second image sensor. A relative position and orientation between the second image sensor and the first image sensor may be established by the calibration logic based on a result of the establishing obtained for the pair and a result of the establishing obtained for the other pair. Thereby, the relative position and orientation between the first image sensor and the intermediate image sensor and the relative position and orientation between the intermediate image sensor and the second image sensor may be computationally processed by the calibration logic to compute the relative position and relative orientation between the second image sensor and the first image sensor. This processing may be performed by the calibration logic if the first and second image sensors do not have overlapping fields of view and/or if no plurality of objects is positioned in an overlapping area of the FOVs of these sensors.

The capturing, determining and establishing steps may be performed by the calibration logic for each pair of further plurality of pairs of image sensors. The relative position and orientation between the second image sensor and the first image sensor may also be established by the calibration logic based on results of the establishing step obtained for the further plurality of pairs. Thereby, the relative position and orientation between the second image sensor and the first image sensor may be determined by the calibration logic in two independent configurations. This allows the calibration logic perform a consistency check. Further, the calibration logic may quantify and enhance reliability of the calibration of the vision system. In the method, values of extrinsic parameters that may define relative orientations and positions between image sensors may be iteratively adjusted by the calibration logic until the logic obtains a consistent set of parameters defining relative orientation(s) of non-adjacent image sensors.

In the method, a relative position and orientation between a first image sensor and a second image sensor may be computed in two different ways, for example; namely using results of the establishing obtained for the plurality of pairs and the further plurality of pairs different from the plurality of pairs. The calibration logic may compare these results. For example, the calibration logic may determine position and orientation of a rear image sensor of a vehicle vision system relative to a front image sensor of the vehicle vision system using a left side image sensor as intermediate image sensor, or using a right side image sensor as intermediate sensor. The calibration logic may compare the resulting values, and the comparison may be utilized by an optimization procedure. The calibration logic may use the optimization procedure to enforce a constraint of the optimization procedure.

As already implied, a FOV of a first image sensor and a FOV of a second image sensor may be disjoint. For example, the first image sensor and the second image sensor reside at opposite sides of a vehicle.

The method performed by the calibration logic may further include determining extrinsic parameters of the plurality of image sensors in a reference frame (such as a vehicle reference frame) based on results of the establishing obtained for the plurality of pairs. To this end, the calibration logic may use one of the image sensors as a reference to determine orientations and positions of all other image sensors relative to the reference image sensor. The calibration logic may also determine the positions and orientations relative to another reference frame (such as another vehicle reference frame), further using the known position and orientation of the reference image sensor relative to the other reference frame.

Determining the extrinsic parameters in a reference frame may include computing re-projections of a plurality of objects of the surroundings. The calibration logic may determine image coordinates of a plurality of objects in a first and second image. The logic may determine image coordinates of the objects when projected onto a projection surface using both the positions determined for the first and second image, based on the extrinsic parameters for the first and second image sensor. The calibration logic may compare the positions of the objects on the projection surface. If the positions differ by more than a threshold, the extrinsic parameters may be corrected by the calibration logic. Thereby, the calibration logic may identify a consistent set of extrinsic parameters.

The calibration logic may use the determined extrinsic parameters to compute a surround view based on images captured by the plurality of image sensors. Further, the calibration logic may control a display based on a user selection defining a section of the surround view that the user desires to view. The logic may also control the display based on images captured by the image sensors and on the determined extrinsic parameters.

The plurality of objects in the surroundings of the object (such as the vehicle) may include at least three objects located on a first plane and at least three objects located on a second plane. The calibration logic may arrange the first plane and the second plane at an angle relative to each other. The first plane and the second plane may be arranged at an angle between 0° and 90° relative to each other, for example. This allows not only extrinsic, but also intrinsic parameters to be determined. Intrinsic parameters may facilitate correcting optical distortions, such as fisheye distortions.

The plurality of objects may further include at least three objects located on a third plane. The first plane, the second plane, and the third plane may be orthogonal. In other words, the plurality of objects may be located as a trihedron with the objects located on the three orthogonal planes.

In the method, intrinsic parameters of the image sensor may be established based on the image, and intrinsic parameters of the further image sensor may be established based on the further image. This allows both extrinsic and intrinsic parameters of the vehicle vision system to be established in the calibration procedure. The intrinsic parameters may be stored for subsequent use in correcting image distortions.

As implied above, each image sensor may include a fisheye or another type of wide-angle lens. Also, at least two of the image sensors may be positioned at side door mirrors of a vehicle, for example.

With respect to the vision system (which may be a vehicle vision system) that includes a plurality of image sensors and an image processing unit, the image sensors may include an optical component to capture images having a non-linear distortion. The image sensors may be located at different spots on the object hosting the vision system. The image processing unit may process image data captured by the plurality of image sensors. Further, the image processing unit may include the calibration logic. In order to calibrate the vision system, the image processing unit may identify a plurality of objects included both in a first and second image captured by a first and second image sensor, respectively. The image processing unit may determine a position and orientation of the first and second image sensor relative to the plurality of objects based on the first and second captured image. The image processing unit may establish a relative position and orientation between the first and second image sensor based on the determined position and orientation of the first and second image sensor relative to the plurality of objects. The image processing unit may also calibrate the vision system even if the position of the plurality of objects relative to the object hosting the vision system is not a known priori. Also, the image processing unit may facilitate some of the determining and establishing for the plurality of pairs of image sensors mentioned above. The image processing unit may also determine relative position of a first image sensor and a second image sensor that have disjoint fields of view using relative positions and orientations determined for multiple pairs of image sensors having overlapping FOVs. For example, the image processing unit may compute the relative position orientation between the second image sensor and the first image sensor based on the relative position and orientation between the first image sensor and an intermediate image sensor, and further based on the relative position and orientation between the intermediate image sensor and the second image sensor.

The vision system may also include a display unit. The image processing unit may use parameters of the vision system determined during calibration when outputting a section of a surround view via the display. The vision system may also include an input interface that allows a user to select a section of a view (e.g., surround view) which is to be visually outputted via the display unit.

2. Example Embodiments

Throughout the description, identical or similar reference numerals refer to identical or similar components. While some embodiments will be described in specific contexts, such as a surround view system of a vehicle, embodiments are not limited to these specific contexts. For example, terms such as vehicle vision system and vehicle reference frame are used herein for illustrative purposes. Terms such as "forward", "front", "rearward", "rear", or "side" as used in the context of vehicle vision systems may relate to a vehicle reference frame. For example, the "forward" direction is the direction visible to the driver through the windshield.

FIG. 1 is a schematic view showing an example vehicle 1. The vehicle 1 includes a vehicle vision system, such a surround view system. The vehicle vision system may include a plurality of image sensors 11-14 and an image processing unit 10 coupled to the plurality of image sensors 11-14.

The image sensors 11-14 may be wide-angle image sensors. A field of view (FOV) of the image sensors 11-14 may respectively have a lateral opening angle (e.g., an opening angle in a plane parallel to a base plane of the vehicle 1) of at least 170°. The FOVs of the image sensors 11-14 may each have lateral opening angles of at least 175°. Each image sensor 11-14 may be a camera and may include a fisheye lens. The image sensors are configured such that, in order to accommodate a wide FOV, they capture images that have a non-linear distortion. The wide-angle characteristics and resulting non-linear distortions may be caused by optical components of the image sensors. The images captured by the image sensors 11-14 may respectively show a non-linear radial distortion, a non-linear barrel distortion and/or a non-linear fisheye distortion. The image sensors 11-14 each may comprise an electro-optical sensor, for example. Also, the image sensors 11-14 each may include a charge-coupled device (CCD) sensor. The electro-optical sensors of the image sensors 11-14 may be coupled to the image processing unit of the vehicle vision system.

As mentioned, the vehicle vision system may be a surround view system. In this case, the FOVs 15-18 of the image sensors 11-14 may cover a full 360° angular range around the vehicle 1 in at least one plane parallel to a vehicle base plane. An opening angle of the FOVs 15-18 in this plane may be at least 170° to 175°. For example, opening angle 20 of FOV 15 of image sensor 11 may be at least 170° to 175°.

Further, the image sensor 11, which may be installed at the vehicle front, may have the FOV 15 facing in a forward direction. The image sensor 12, which may be installed at the vehicle rear, may have the FOV 16 facing in a rearward direction. The other depicted image sensors 13 and 14, which may be installed at sides of the vehicles, may have a FOV 16 or 18, respectively, which is directed towards the respective side of the vehicle. The image sensors 13 and 14 installed at the sides may be installed in side view mirrors. If the side view mirrors have moveable components, the image sensors 13 and 14 may be installed in a stationary section of the door mirrors.

The processing unit 10 may receive the image data generated by the image sensors 11-14 and to use the image data in such a way that a surround view is generated. The processing unit 10 may also determine both extrinsic and intrinsic parameters of the image sensors 11-14 in a method, such as the above mentioned methods, performed by calibration logic. Intrinsic parameters may include parameters and models for wide-angle image sensors that define the non-linear distortion of the captured images. Examples for such models include polynomial models of radial distortion, non-polynomial models of fisheye distortion, a FOV model, and a perspective model. The processing unit 10 may store the intrinsic parameters determined in the calibration procedure. The processing unit 10 may retrieve the intrinsic parameters when merging images in order to correct for non-linear distortions in captured images.

The extrinsic parameters of the vehicle vision system include information on position and orientation of image sensors in a vehicle reference frame, which may be attached to the vehicle. One of the image sensors, such as image sensor 11, may define the vehicle reference frame, for example. In order to determine the extrinsic parameters, the calibration logic may determine the position and orientation of the image sensors 12-14 relative to the position and orientation of the image sensor 11. The logic may also determine the extrinsic parameters with reference to any other coordinate system related to the vehicle. For example, first, the calibration logic may determine the position and orientation of the image sensors 12-14 relative to the position and orientation of the image sensor 11. Based on a known position and orientation of the image sensor 11 in the vehicle reference system, the calibration logic may determine the position and orientation of all image sensors 11-14.

The processing unit 10 may also determine, via the calibration logic, the extrinsic parameters of the image sensors 11-14 by evaluating pairs of images captured by image sensors having overlapping FOVs. Extrinsic parameters are not determined separately, in a one-by-one fashion, for each camera. The calibration process is performed to establish a consistent set of extrinsic parameters for the various image sensors, e.g., for image sensors 11-14. This consistent set of extrinsic parameters is determined by combining images captured using different image sensors.

Further, the calibration logic may determine relative positions and orientations between a first and second image sensor having overlapping FOVs. A plurality of objects may be located in an overlapping region of the FOVs of the image sensors. The locations of the plurality of objects relative to each other are known. For example, the plurality of objects may include markings in a known arrangement, such as a checkerboard pattern, with the spacing between corners of the checkerboard being known to the calibration logic. The position of the plurality of objects relative to the vehicle 1 does not need to be known.

The calibration logic may also determine the position and orientation of an image sensor relative to the plurality of objects. To do this, the logic may determine the matrix elements of a rotation matrix and the vector elements of a translation vector. These elements define the mapping between point coordinates in a coordinate system of the plurality of objects and image coordinates of an image captured by an image sensor. Similarly, the position and orientation of another image sensor that captures another image of the plurality of objects may be determined relative to the plurality of objects. Based on the position and orientation of the image sensor relative to the plurality of objects and on the position and orientation of the other image sensor relative to the same plurality of objects, the relative position and orientation between the image sensor and the other image sensor may be derived by the calibration logic. By repeating these acts for multiple pairs of image sensors having overlapping FOVs, the relative position and orientation between image sensors which have overlapping FOVs may be determined by the logic. Using this data, the calibration logic then may determine relative position and orientation between image sensors that have non-overlapping FOVs.

Further, FIG. 1 illustrates a plurality 22 of objects 24-26. The plurality 22 of objects is positioned in an overlapping region 21 of a FOV 15 of the image sensor 11 and of a FOV 17 of the image sensor 13. The objects 24-26 are arranged on at least one plane 23. The objects 24-26 may be configured to be readily detected using object recognition schemes, such as edge detection. For example, the objects 24-26 may be corners of rectangles of a checkerboards pattern. While only three objects located in a plane 23 are illustrated in FIG. 1, the plurality 22 of objects may have a trihedron configuration. The plurality 22 of objects may include at least three objects located on a first plane, at least three objects located on a second plane, and at least three objects located on a third plane. The first, second, and third plane may be orthogonal. Greater numbers of objects may be positioned on each plane to enhance effectiveness of the calibration procedure. For example, the plurality 22 of objects may include at least six objects located on the first plane, at least six objects located on a second plane, and at least six objects located on a third plane.

A first image of the plurality 22 of objects captured by the image sensor 11 and a second image of the plurality 22 of objects captured using the second image sensor 13 are evaluated. These images are captured while the plurality 22 of objects is in the same position relative to the vehicle 1. The position relative to the vehicle 1 does not need to be a known priori. The first image captured by the first image sensor 11 and the second image captured using the second image sensor 13 are processed to determine the relative position and orientation between the first image sensor 11 and the second image sensor 13. Additionally, intrinsic parameters of the first image sensor 11 may be determined based on the image captured by first image sensor 11, and intrinsic parameters of the second image sensor 13 may be determined based on the second image captured by the second image sensor 13.

Similarly, the relative position and orientation between the image sensor 13 and the image sensor 12 may be determined by capturing an image of a plurality 27 of objects positioned in an overlapping region of the FOV 17 of the image sensor 13 and of the FOV 16 of the image sensor 12. The calibration logic then may perform the procedures explained above for the pair of image sensors 11 and 13.

Similarly, the relative position and orientation between the image sensor 11 and the image sensor 14 may be determined by capturing an image of a plurality 29 of objects positioned in an overlapping region of the FOV 15 of the image sensor 11 and of the FOV 18 of the image sensor 14. The relative position and orientation between the image sensor 14 and the image sensor 12 may be determined by capturing an image of a plurality 28 of objects positioned in an overlapping region of the FOV 18 of the image sensor 14 and of the FOV 16 of the image sensor 12. For any pair of image sensors having overlapping FOVs, processing of the captured images may be done in the same way as explained above for the pair of image sensors 11 and 13.

Illustrated in FIG. 1 is the plurality 22 of objects in an overlapping region of FOVs of a pair including image sensors 11 and 13, another plurality 27 of objects in an overlapping region of FOVs of a pair including image sensors 13 and 12, another plurality 29 of objects in an overlapping region of FOVs of a pair including image sensors 11 and 14, and another plurality 28 of objects in an overlapping region of FOVs of a pair including image sensors 14 and 12. Markings used for determining a relative position and orientation between image sensors having overlapping FOVs do not need to be present at the same time. For example, a trihedron may first be located in the overlapping region 21 of FOVs 15 and 17 of the image sensors 11 and 13 to determine the relative position and orientation between the image sensors 11 and 13. The calibration logic may then re-position the trihedron to the other overlapping regions, to determine sequentially the relative position and orientation between image sensors having overlapping FOVs. Further, the plurality of objects may also be positioned at different locations in the overlapping region 21 in a time sequential manner, in order to increase the amount of data available for calibration.

Figure 2:
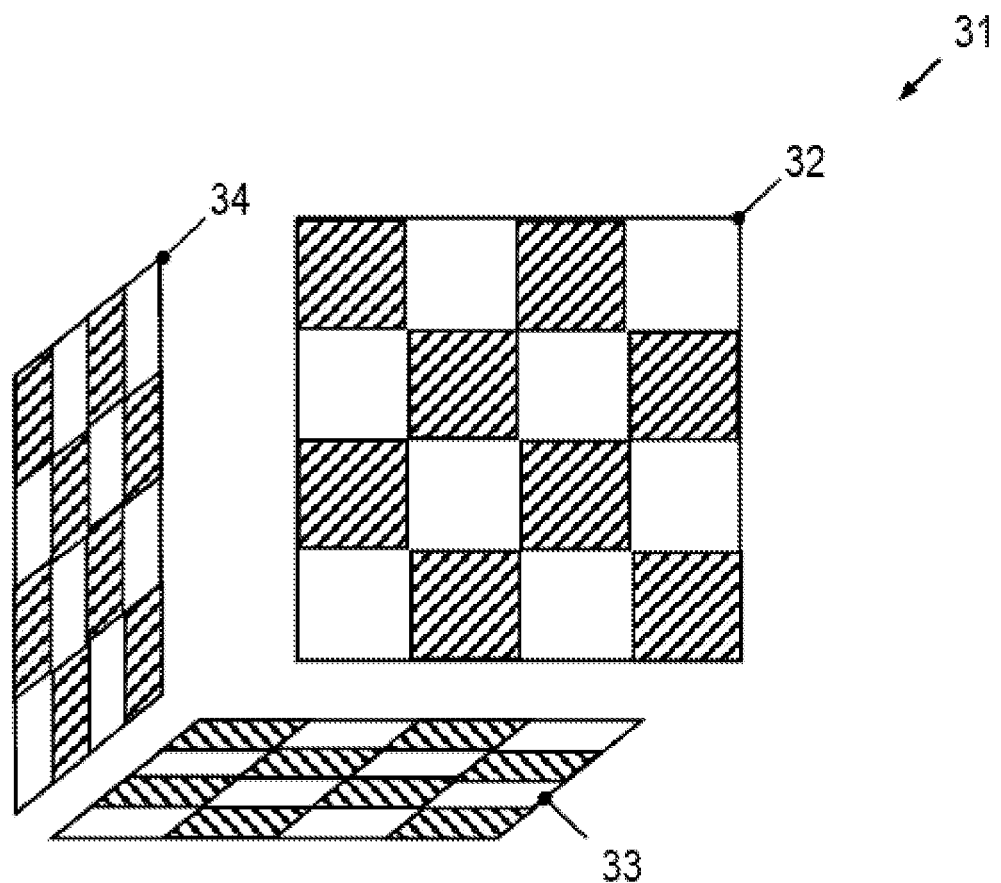
FIG. 2 is a schematic representation of an example plurality 31 of objects.

FIG. 2 is a schematic representation of a plurality 31 of objects. The plurality 31 of objects used for calibration includes markings provided on three different planes 32-34. The three planes 32-34 may be orthogonal, as shown in FIG. 2, or may be arranged at other angles relative to each other. A checkerboard pattern is depicted on each one of the planes 32-34. The plurality 31 of objects may include the corners of the checkerboard patterns. The relative positions of these objects may be quantified. For example, the plurality 31 of objects may be parameterized with respect to lengths of one or more edges the checkerboard patterns. Also, the corners of the checkerboard patterns may be detected by the calibration logic in captured images using edge detection algorithms.

With respect to objects and markings used for calibration, such objects and markings may be positioned on at least two different planes. The at least two planes may be arranged at an angle of 90° relative to each other, for example. On each one of the planes, at least three objects (e.g., six objects) may be provided, for example. In a plurality of objects, the objects may not be located on one plane. Some of the objects may be positioned such that they are spaced from a plane in which at least three other objects are located, for example.

Figure 3:
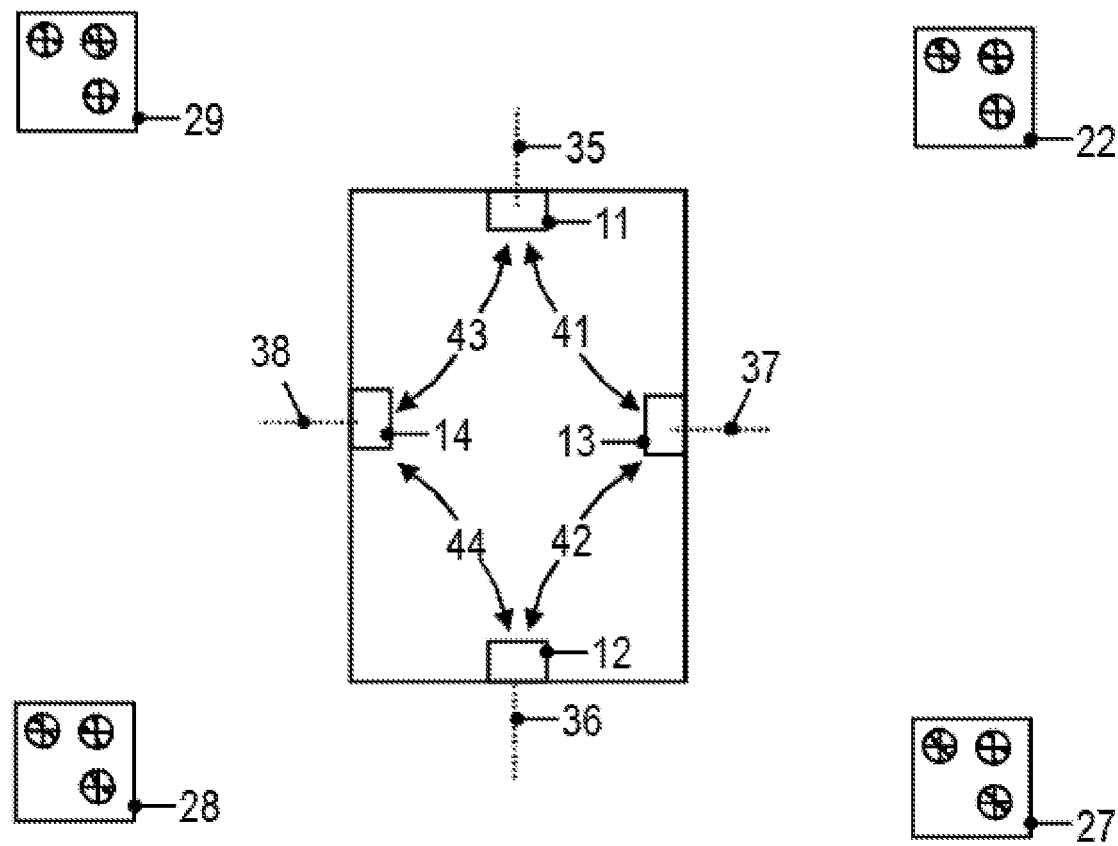
FIG. 3 is another schematic view of the example vehicle 1.

FIG. 3 is another schematic view of the example vehicle 1.

Images of the plurality 22 of objects, which may be images of markings such as checkerboard patterns, are captured by the first image sensor 11 and by the second image sensor 13 of a pair 41 of image sensors. Based on these images, a relative position and orientation between the image sensor 11 and the image sensor 13 may be determined by the calibration logic. Further, intrinsic parameters of the image sensor 11 and of the image sensor 13 may be determined by the calibration logic.

The relative position between the image sensor 11 and the image sensor 13 may be defined by a translation vector between a characteristic point of the image sensor 11 and a characteristic point of the image sensor 13. The relative orientation between the image sensor 11 and the image sensor 13 may be defined by a rotation matrix for aligning a coordinate system of the image sensor 11 and a coordinate system of the image sensor 13 with each other. An axis 35 of the coordinate system of the image sensor 11 may be a characteristic axis of the optical system of the image sensor 11, such as an optical axis. Similarly, an axis 37 of the coordinate system of the image sensor 13 may be a characteristic axis of the optical system of the image sensor 13, such as an optical axis.

By processing images of the plurality 27 of objects located in an overlapping region of FOVs, the relative position and orientation of the image sensors 13 and 12 of a pair 42 may be determined by the calibration logic. By processing images of the plurality 29 of objects positioned in an overlapping region of FOVs, the relative position and orientation of the image sensors 11 and 14 of a pair 43 may be determined by the calibration logic. By processing images of the plurality 28 of objects positioned in an overlapping region of FOVs, the relative position and orientation of the image sensors 14 and 12 of a pair 44 may be determined by the calibration logic.

The relative positions and orientations determined by the calibration logic may facilitate a consistency check performed by the logic. For example, the relative position and orientation between the image sensors 12 and 11 may be determined in two different ways. The calibration logic may compute the relative position and orientation between the image sensors 12 and 11 based on results obtained for the pairs 41 and 42. The calibration logic may also compute the relative position and orientation between image sensors 12 and 11 based on results obtained for the pairs 43 and 44. In general, the calibration logic may determine the relative position and orientation between image sensors 12 and 11 based on comparisons of data captured from different pairs of image sensors. The calibration logic may perform such comparisons via an optimization procedure in which extrinsic parameters of all image sensors 11-14 may be determined with respect to the relative position and orientation of the image sensors 11 and 12 having similar values. This comparison may be made independent of whether the calibration logic uses the relative position and orientation determined for the pairs 41-44.

Figure 4:
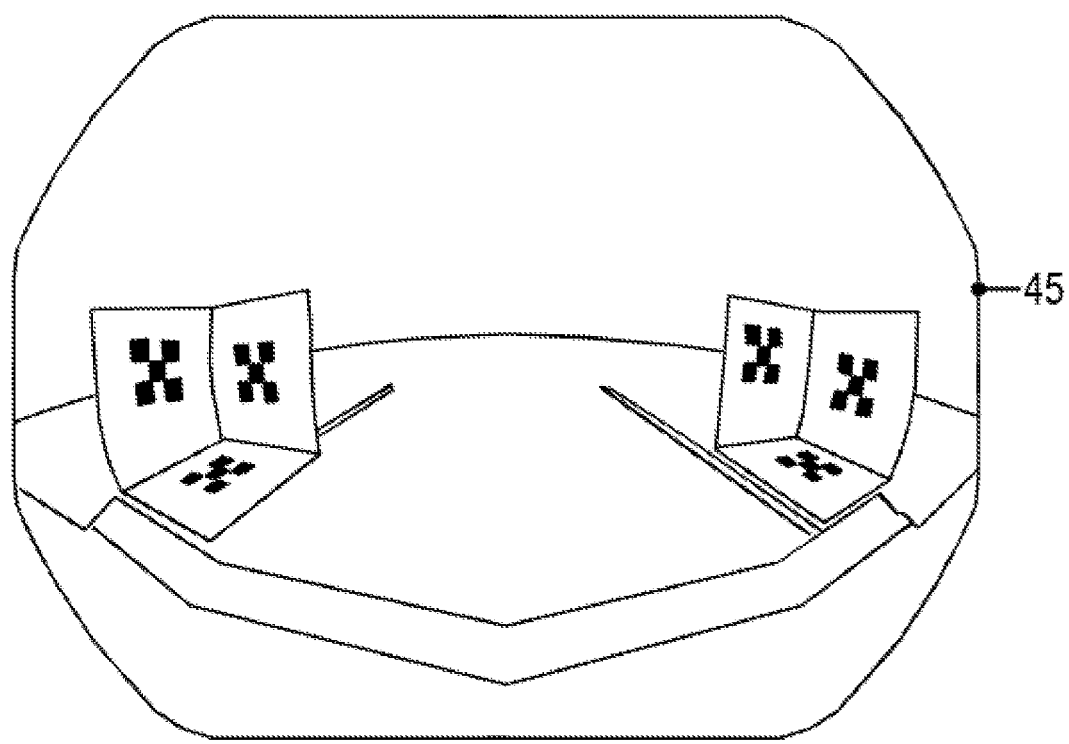
FIG. 4 is an illustration of an example image 45 captured by an example image sensor.
Figure 5:
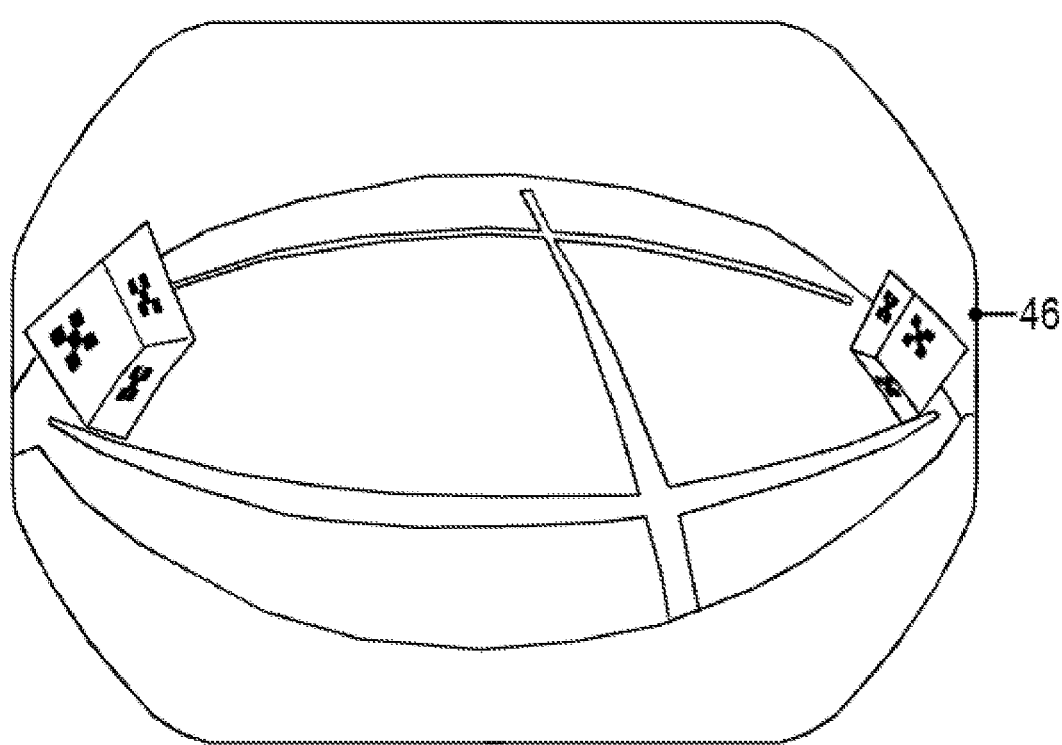
FIG. 5 is an illustration of an example image 46 captured by another example image sensor.

FIG. 4 is an illustration of an image 45 captured by an image sensor. FIG. 5 is an illustration of an image 46 captured using another image sensor. The images 45 and 46 are captured using image sensors having overlapping FOVs. For example, the image 45 may be captured by the image sensor 11, and image 46 may be captured by the image sensor 13.

A trihedron with checkerboard patterns on a right-hand side of the image 45 represents the same plurality of objects as a trihedron with checkerboard patterns on the left-hand side of image 46. This arrangement may allow the calibration logic to determine the relative position and orientation between the image sensors that captured the images 45 and 46.

In one aspect of the calibration system, the calibration logic may be configured to perform procedures that include: (A) determining, for an image sensor of a pair of image sensors, a position and orientation of the image sensor relative to a coordinate system defined by a plurality of objects; (B) determining the relative position and orientation between the image sensor of the pair and another image sensor of the pair, using the results of (A); and (C) determining a relative position and orientation of image sensors which have disjoint FOVs, using the results of (B).

(A) Determining a Position and Orientation of an Image Sensor Relative to a Coordinate System Defined by a Plurality of Objects The calibration logic may use homogeneous coordinates to define mapping between coordinates of the plurality of objects defined in a coordinate system of the plurality of objects and the image plane of the image sensor. This mapping may be done via matrix multiplication. In the coordinate system defined by the plurality of objects, coordinates of an object may be described as a 4-vector, $$\vec{X} = \begin{bmatrix} X \\ Y \\ Z \\ 1 \end{bmatrix}, \quad (1)$$

where X, Y and Z are the coordinates in the coordinate system of the plurality of objects. Homogeneous coordinates are used, with $\vec{X}$ having four lines.

The projection of an object having coordinates given by Equation (1) onto the image plane of the image sensor may be defined as $$\vec{x} = \begin{bmatrix} x \\ y \\ z \end{bmatrix}, \quad (2)$$

where $$z = a_0 + a_1 d \ldots + a_n d^n \quad (3)$$

may be a polynomial for a non-radial distortion of the image captured by the image sensor. For example, for an image sensor having a fisheye lens, Equation (3) may describe a polynomial approximation for the fisheye distortion. In Equation (3), d may denote the distance from the image's center.

The coefficients $a_0, a_1, \ldots, a_n$ may represent intrinsic parameters of the image sensor having non-linear distortion.

Depending on a model that the calibration logic uses to describe the non-linear distortion of the optical system of the image sensor, other representations for the z-component may be used. Correspondingly, different intrinsic parameters may be determined by the calibration logic depending on the model used to describe the non-linear distortions.

While the parameters of a polynomial model for the non-linear distortion of the image sensors may be determined in the calibration, other models may be used to described the image sensors. Examples for such models include non-polynomial models of fisheye distortion, a FOV model, or a perspective model. The parameters of these models may also be determined in the calibration.

As mentioned, in using homogeneous coordinates, the mapping from the coordinate system associated with the plurality of objects to the image space may be described using matrix multiplication. For example, a matrix H may be described as $$H = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix}. \quad (4)$$

where H includes rotation parameters R and translation parameters T. The matrix H, once known, may describe a position and orientation of an image sensor relative to the coordinate system associated with the plurality of objects. The matrix product of matrix H $$H\vec{X} \quad (5)$$

has vector components that are collinear with $\vec{x}$.

The plurality of objects may include objects located on a first plane and may also include other objects located on a second and third plane. The planes may be orthogonal, for example. Below, a description for determining matrix elements of the matrix H is described with respect to a plane. A similar technique may apply to other planes as well, such as other planes of the three planes of the trihedrons described above.

Coordinates of objects located on a plane may be assumed to satisfy Z=0. In other words, the plane is the X-Y plane of a trihedron, for example. A condition where the first three components of $H\vec{X}$ are collinear with $\vec{x}$ may then be described as:

$$\begin{bmatrix} x \\ y \\ z \end{bmatrix} \times \left( \begin{bmatrix} R_{11} & R_{12} & T_1 \\ R_{21} & R_{22} & T_2 \\ R_{31} & R_{32} & T_3 \end{bmatrix} \begin{bmatrix} X \\ Y \\ Z \end{bmatrix} \right) = 0. \quad (6)$$

In Equation (6), the vector product of collinear vectors is equal to zero. Equation (6) may describe the coordinates of objects (e.g., corners of a checkerboard pattern or other marking) and corresponding image point coordinates. The x- and y-image point coordinates may be determined by image recognition, for example.

Objects located on a plane are represented below by an index "j". Xj and Yj represent coordinates of object j in the X-Y-plane of the coordinate system defined by the plurality of objects. The values $x_j$ and $y_j$ are image point coordinates for the object j in the image plane of the image sensor. Equation (6), when multiplied out, may be described as the following set of equations:

$$y_j(R_{31}X_j+R_{32}Y_j+T_3)-(a_0+a_1d \ldots +a_nd^n)(R_{21}X_j+R_{22}Y_j+T_2)=0, \quad (7a)$$

$$(a_0+a_1d \ldots +a_nd^n)(R_{11}X_j+R_{12}Y_j+T_1)-x_j(R_{31}X_j+R_{32}Y_j+T_3)=0, \quad (7b)$$

$$x_j(R_{21}X_j+R_{22}Y_j+T_2)-y_j(R_{11}X_j+R_{12}Y_j+T_1)=0. \quad (7c)$$

Equation (7c) may be independent of $z=a_0+a_1d \ldots +a_nd^n$. Also, Equation (7c) may be independent of intrinsic parameters of the image sensor. Equation (7c) may include representations of various objects located on the plane. Equation (7c) may be used to determine the parameters of the matrix H, with the exception of the parameter T3.

Defining a Vector $$\vec{M} = \begin{bmatrix} R_{11} \\ R_{12} \\ R_{21} \\ R_{22} \\ T_1 \\ T_2 \end{bmatrix} \quad (8)$$

that includes parameters of the H-matrix, and where Equation (7c) may depend on such parameters; Equation (7c) may be described in matrix form.

A matrix $$L = \begin{bmatrix} -y_1X_1 & -x_1Y_1 & x_1X_1 & y_1Y_1 & -x_1 & y_1 \\ -y_2X_2 & -x_2Y_2 & x_2X_2 & y_2Y_2 & -x_2 & y_2 \\ -y_3X_3 & -x_3Y_3 & x_3X_3 & y_3Y_3 & -x_3 & y_3 \\ & & \ldots & & & \end{bmatrix} \quad (9)$$

may describe a matrix that has lines each representing an object located in a plane of a coordinate system of a plurality of objects. In order to reduce noise and to enhance stability, the number of objects may be increased, such as to number greater than six.

In the above case, Equation (7c) defines an over-determined set of equations for the parameters of the H-matrix, which are components of a vector of Equation (8). To solve this overdetermined set of equations, the vector $\vec{M}$ is determined for which the matrix product $$\|L\vec{M}\| \quad (10)$$

becomes minimum under a constraint that $\vec{M}$ has a fixed modulus, e.g., under the constraint that $$\|\vec{M}\|=1. \quad (11)$$

Other techniques for solving the overdetermined set of equations to determine the vector $\vec{M}$ may be employed as well.

Considering columns of the part of matrix H that describes a rotation (the 3×3 matrix in the left upper corner of Equation (4)) are orthonormal, the remaining parameters of the rotation may be determined from $R_{11}$, $R_{12}$, $R_{21}$, and $R_{22}$ by the calibration logic. All elements of H with the exception of T3 may be determined once Equation (10) has been solved under the constraint of Equation (11).

With objects located on various planes, the various calculations described above may be performed by the calibration logic for any plane of the various planes. Mapping between objects located on the various planes and the image plane of the image sensor may be described by the matrix H. As shown illustrated above, by combining equations that are independent of intrinsic parameters of an image sensor, an over-determined set of equations for matrix elements of the matrix H may be established by the calibration logic.

Further, as mentioned above, the calibration logic may use the above equations to determine some of the parameters of the matrix H. For example, the results for matrix elements of the matrix H may be re-inserted into Equations (7a) and (7b). The resulting set of equations may be linear in that the intrinsic parameters $a_0, a_1, \ldots, a_n$ may be unknown matrix elements of the matrix H. Where, the T3 matrix element has remained undetermined, for example, when solving Equation (10), the T3 matrix element may be determined based on Equations (7a) and (7b).

Also, to possibly stabilize this system, equations which are obtained for sets of objects located on various planes (e.g., for the different markings located on the three orthogonal planes of the trihedron shown in FIG. 2) may be combined into one matrix equation, for example. For a plurality of objects in which markings are provided on three orthogonal planar boards, an index "i" may be introduced which refers to the planar boards. For three planar boards, $1 \leq i \leq 3$, Equations (7a) and (7b) may be described as the following matrix equation. For simplicity, it is assumed that the same amount of objects (represented by "k") is situated on each board:

$$\begin{bmatrix} \text{Board1} \\ A_{1,1}, A_{1,1}d_{1,1} \ldots A_{1,1}d_{1,1}^n, -y_{1,1}, 0, 0 \\ C_{1,1}, C_{1,1}d_{1,1} \ldots C_{1,1}d_{1,1}^n, -x_{1,1}, 0, 0 \\ \ldots \\ A_{1,k}, A_{1,k}d_{1,k} \ldots A_{1,k}d_{1,k}^n, -y_{1,k}, 0, 0 \\ C_{1,k}, C_{1,1}d_{1,k} \ldots C_{1,1}d_{1,k}^n, -x_{1,k}, 0, 0 \\ \text{Board2} \\ A_{2,1}, A_{2,1}d_{2,1} \ldots A_{2,1}d_{2,1}^n, 0, -y_{2,1}, 0 \\ C_{2,1}, C_{2,1}d_{2,1} \ldots C_{2,1}d_{2,1}^n, 0, -x_{2,1}, 0 \\ \ldots \\ A_{2,k}, A_{2,k}d_{2,k} \ldots A_{2,k}d_{2,k}^n, 0, -y_{2,k}, 0 \\ C_{2,k}, C_{2,1}d_{2,k} \ldots C_{2,1}d_{2,k}^n, 0, -x_{2,k}, 0 \\ \text{Board3} \\ A_{3,1}, A_{3,1}d_{3,1} \ldots A_{3,1}d_{3,1}^n, 0, 0, -y_{3,1} \\ C_{3,1}, C_{3,1}d_{3,1} \ldots C_{3,1}d_{3,1}^n, 0, 0, -x_{3,1} \\ \ldots \\ A_{3,k}, A_{3,k}d_{2,k} \ldots A_{3,k}d_{3,k}^n, 0, 0, -y_{3,k} \\ C_{3,k}, C_{3,1}d_{3,k} \ldots C_{3,1}d_{3,k}^n, 0, 0, -x_{3,k}, \end{bmatrix} \cdot \begin{bmatrix} a_0 \\ \ldots \\ a_N \\ T_{1,3} \\ T_{2,3} \\ T_{3,3} \end{bmatrix} = \begin{bmatrix} B_{1,1} \\ D_{1,1} \\ \ldots \\ B_{1,k} \\ D_{1,k} \\ B_{2,1} \\ D_{2,1} \\ \ldots \\ B_{2,k} \\ D_{2,k} \\ B_{3,1} \\ D_{3,1} \\ \ldots \\ B_{3,k} \\ D_{3,k} \end{bmatrix} \quad (12)$$

In Equation (12), the following definitions are used:

$$A_{i,j}=R_{i,21}X_{i,j}+R_{i,22}Y_{i,j}$$

$$B_{i,j}=y_{i,j}(R_{i,31}X_{i,j}+R_{i,32}Y_{i,j})$$

$$C_{i,j}=R_{i,11}X_{i,j}+R_{i,12}Y_{i,j}+T_{i,1}$$

$$D_{i,j}=x_{i,j}(R_{i,31}X_{i,j}+R_{i,32}X_{i,j}) \quad (13)$$

The index i represents a board number. The index j represents objects on the board. For example, $y_{i,j}$ denotes point j on board i. $R_{i,ab}$ and $T_{i,a}$ denote components of the matrix H for board i. For example, $R_{i,21}$ denotes the matrix element $R_{21}$ in the matrix H (Equation (4)) for the board i.

The equation system defined by Equations (12) and (13) may be over-determined. The calibration logic may solve the equation system, for example, by using a matrix pseudoinverse. Therefore, the calibration logic may determine the matrix elements of the matrix H that define mapping between objects located in an overlapping region of FOVs onto an image plane of an image sensor. Additionally, the intrinsic parameters of the image sensor may be determined.

The matrix elements of the matrix H may describe a position and orientation of the image sensor relative to the coordinate system of the plurality of objects that are mapped onto the image plane of the image sensor. The position and orientation of an image sensor relative to the coordinate system of the plurality of objects may be determined by the calibration logic for at least two image sensors that both capture an image of the plurality of objects. The calibration logic may determine the position and orientation of the image sensor relative to the pattern positioned in the overlapping region of the FOVs as described above.

(B) Establishing a Relative Position and Orientation Between Image Sensors Having Overlapping FOVs Based on matrix elements of a plurality of matrix H, determined for image sensors having overlapping FOVs, the calibration logic may determine the relative position and orientation between the image sensors having overlapping FOVs.

Different image sensors will be referred to by indices $\alpha$, $\beta$, and $\gamma$ in the following paragraphs. The indices may denote three of the image sensors 11-14.

For any pair of image sensors, the relative orientation between these image sensors may defined by a rotation matrix $R^{(\alpha, \beta)}$. The rotation matrix $R^{(\alpha, \beta)}$ may be a 3×3 matrix defining rotations for aligning coordinate systems of image sensors $\alpha$ and $\beta$. The relative position between the image sensors may be defined by a translation vector $T^{(\alpha, \beta)}$. The translation vector $T^{(\alpha, \beta)}$ may be a 3-vector defining displacement between origins of the coordinate systems of the image sensors $\alpha$ and $\beta$.

If $\Omega$ denotes a trihedron with markings (or a plurality of objects) that may be used in a calibration, the 3×3 matrix in the upper left corner of the matrix H, defined in Equation (8), may represent a rotation matrix $R^{(\alpha, \Omega)}$ that describes orientation of the image sensor $\alpha$ relative to the plurality of objects $\Omega$. Similarly, the top three elements in the last column of the matrix H, defined in Equation (8), may be a translation vector $R^{(\alpha, \Omega)}$ that describes position of image sensor $\alpha$ relative to the plurality of objects $\Omega$.

The relative position and orientation between image sensors having overlapping fields of view in which the plurality of objects $\Omega$ is arranged may be determined according to:

$$R^{(\alpha,\beta)}=R^{(\alpha,\Omega)}(R^{(\beta,\Omega)})^{-1}=R^{(\alpha,\Omega)}(R^{(\beta,\Omega)})^T \text{ and} \quad (14)$$

$$T^{(\alpha,\Omega)}=T^{(\alpha,\Omega)}-R^{(\alpha,\beta)}T^{(\beta,\Omega)}. \quad (15)$$

The rotation matrices and translation vectors on the right-hand side of Equations (14) and (15) are respectively determined by the calibration logic with respect to the coordinate system of the patterns positioned in the overlapping region of the FOVs of the two image sensors $\alpha$ and $\beta$.

The image sensors $\alpha$ and $\beta$ may be arranged at different locations on the vehicle 1, for example. To determine the position and orientation of an image sensor relative to the plurality of objects positioned in an overlapping region, different areas of the captured images may be evaluated by the calibration logic. Assuming that the relative position and orientation between the image sensors 11 and 13 may to be established, for example, the plurality 22 of objects may be located on a right side of an image captured by the image sensor 11 and on a left side of an image captured by the image sensor 13. When $R^{(\alpha, \Omega)}$ used in Equations (14) and (15) is determined by the calibration logic, via object recognition performed on the right side of the image captured by image sensor $\alpha$, $R^{(\alpha, \Omega)}$ used in Equations (14) and (15) may be determined by object recognition as well performed on the left side of the image captured by image sensor $\beta$. This technique correspondingly applies to the translation vectors as well.

The relative position and orientation between image sensors having overlapping FOVs may be determined by the calibration logic for all pairs of such image sensors. For a vehicle vision system configured as a surround view system with four image sensors, as illustrated in FIGS. 1-3, the relative position and orientation may be determined, by the calibration logic, between image sensors 11 and 13, between image sensors 13 and 12, between image sensors 11 and 14, and between image sensors 14 and 12. The relative position and orientation may be determined by the calibration logic in a pairwise manner. This provides enhanced flexibility. For example, it may not be required that four trihedrons with patterns are simultaneously positioned in the four overlapping regions of FOVs. One trihedron may be sequentially positioned in four different overlapping regions. The vehicle 1 may not be required to remain stationary relative to a reference frame when the relative positions and orientations of image sensors of different pairs are determined by the calibration logic. For example, the vehicle 1 may move before, during, or after the relative position and orientation between image sensors 11 and 13 are determined, and before, during, or after the relative position and orientation between image sensors of another pair are determined.

(C) Establishing a Relative Position and Orientation Between Image Sensors Having Disjoint FOVs Based on the relative position and orientation obtained for different pairs of image sensors in accordance with the procedures described above, the relative position and orientation between image sensors which have disjoint FOVs may be determined by the calibration logic.

To determine the relative position and orientation between a first image sensor and a second image sensor that do not have overlapping FOVs, the relative positions and orientations obtained for several pairs of image sensors that have overlapping FOVs are determined by the configuration logic. At least one intermediate image sensor may be selected which has an overlapping FOV with at least one of the first image sensor and the second image sensor.

Where the intermediate image sensor has an overlapping FOV with both the first image and the second image sensor, the relative position and orientation between the first and the second image sensor may be computed by the configuration logic based on the relative position and orientation between the first image sensor and the intermediate image sensor and based on the relative position and orientation between the second image sensor and the intermediate image sensor. Where $\alpha$ is the index of the first image sensor, $\beta$ is the index of the second image sensor, and $\gamma$ is the index of the intermediate image sensor:

$$R^{(\alpha,\beta)}=R^{(\alpha,\gamma)}R^{(\gamma,\beta)} \text{ and} \quad (16)$$

$$T^{(\alpha,\beta)}=T^{(\alpha,\gamma)}+R^{(\beta,\gamma)}T^{(\beta,\gamma)}. \quad (17)$$

The rotation matrices and translation vectors on the right side of Equation (16) and (17) may be determined as described above.

For example, referring to the vehicle vision system of FIGS. 1-3, the relative position and orientation between the image sensor 11 installed to face in a forward direction and the image sensor 12 installed to face in a rearward direction may be determined by using the image sensor 13 installed on one side of the vehicle or the image sensor 14 installed on the opposite side of the vehicle as an intermediate image sensor. This would apply similarly for any pair of image sensors having non-overlapping FOVs.

With respect to a vehicle surround view system, the relative position and orientation between image sensors positioned such that their optical axis are directed opposite directions may be determined by the calibration logic in two different ways. This allows a consistency check to be performed by the calibration logic. Further, the consistency check may be enforced as a constraint in an optimization procedure in which the extrinsic parameters of image sensors are determined by the calibration logic.

Referring to FIG. 3, the relative position and orientation between the image sensors 11 and 12 may be determined by the calibration logic using results established for the pairs 41 and 42. The relative position and orientation between the image sensors 11 and 12 may also be determined by the calibration logic using results established for the pairs 43 and 44. A constraint that the values for the relative position and orientation determined for the two sets of pairs are the same may be used by the calibration logic in determining the extrinsic parameters of the vehicle vision system.

When the position and orientation of one image sensor in an arbitrary vehicle reference frame attached to the vehicle is known, the positions and orientations of other image sensors of the vehicle vision system may be determined by the calibration logic using the relative positions and orientations between image sensors. For example, the position and orientation of the image sensor 11 relative to an arbitrary vehicle reference frame may be determined independently. Alternatively, the coordinate system of the image sensor 11 may be defined to coincide with the vehicle reference frame.

A rotation matrix that describes orientation of a reference image sensor α, e.g., image sensor 11, in a vehicle reference frame is denoted below by $R^{(\alpha)}$. The translation vector that describes a position of the reference image sensor in the vehicle reference frame is denoted by $T^{(\alpha)}$. The position and orientation of any other image sensor in the vehicle reference frame can be determined by the calibration logic according to:

$$R^{(\beta)} = R^{(\alpha)} R^{(\alpha,\beta)} \text{ and} \quad (18)$$

$$T^{(\beta)} = T^{(\alpha)} + R^{(\alpha)} T^{(\alpha,\beta)}. \quad (19)$$

For example, where the image sensor 11 facing in a forward direction is used as a reference image sensor, the position and orientation of the image sensor 12 facing in a rearward direction and of the image sensors 13 and 14 facing in a lateral direction may be determined by the calibration logic in the vehicle reference frame according to Equations (18) and (19). For the image sensors 13 and 14, the relative position and relative orientation on the right side of Equations (18) and (19) may be determined as described in (A) above. For the image sensor 12, the relative position and orientation on the right side of Equations (18) and (19) may be determined as described in (B) above.

Stability of the calibration procedure may be further enhanced in various ways. As already described above, for a surround view system, there are different independent ways to determine the position and orientation of at least some of the image sensors. For example, consistency may be enhanced by using the constraint that the values for the position and orientation of such image sensors does not depend on which images are evaluated to determine the position and orientation.

Additionally, a re-projection of the images captured and determined by the calibration logic. For either one of the image sensors which has captured an image of the plurality of objects, the projection onto a projection surface may be computed by the calibration logic based on the established extrinsic parameters, e.g., orientations and positions of the image sensors. The resulting positions of the objects when projected onto the projection surface computed by re-projecting the image of two image sensors of a pair may be compared to each other by the calibration logic. If the positions differ by more than a predetermined threshold, the extrinsic and/or intrinsic parameters may be adjusted in an iterative procedure to lessen the difference. From this iterative adjustment, for example, a set of extrinsic parameters may be obtained by the calibration logic, which yields consistent transitions between re-projected images used by the vehicle vision system after calibration. For example, with reference to FIGS. 4 and 5, a re-projection of the checkerboard trihedron on the right side of the image 45 and a re-projection of the checkerboard trihedron on the left side of the image 46 may coincide. By iteratively adjusting the extrinsic parameters via the calibration logic of the vehicle vision system, a residual mismatch between such images may be reduced.

While relative positions and orientations may be determined using matrix and vector manipulation techniques, a wide variety of processing options is available for determining the position and orientation of an image sensor relative to a trihedron coordinate system and/or for determining relative positions and orientations between image sensors.

Additionally, the amount of data on which calibration is performed may be increased. Noise can thereby be reduced. To this end, the plurality of objects (e.g., the trihedron having three checkerboard patterns or markings) may be positioned at different locations in the same overlapping region of FOVs of image sensors in a sequential manner. For each one of the different positions, the image analysis described above may be performed. Thereby, the number of points used for calibration may be increased.

For example, referring to FIG. 1, the plurality 22 of objects may be shifted to various different locations in the overlapping region 21. The relative position and orientation between the image sensors 11 and 13 may be determined based on the results obtained for the images captured for the various different locations. This is possible because the image system calibration does not require the location of the plurality 22 of objects to be known relative to a priori, such a vehicle's estimated position.

Figure 6:
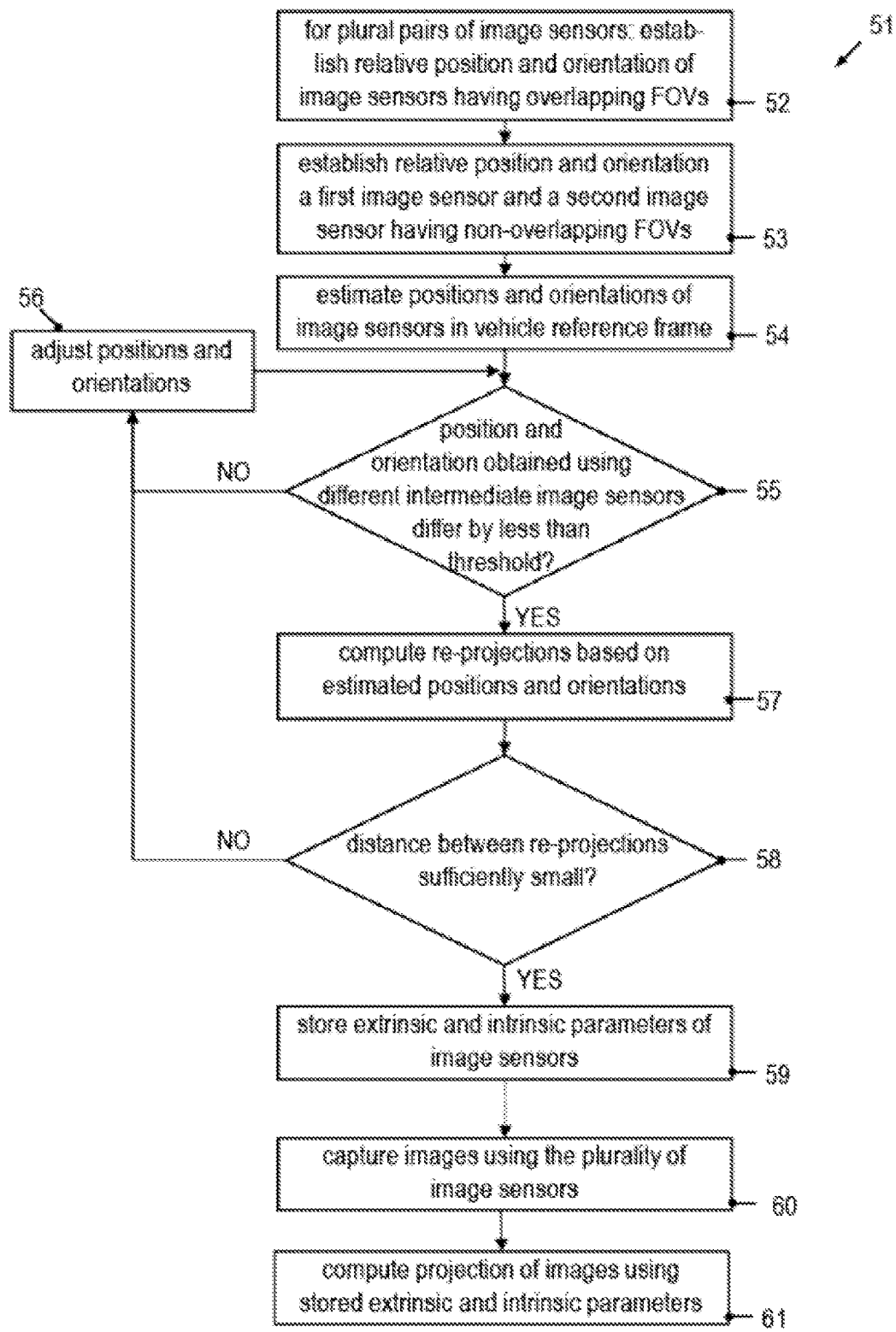
FIG. 6 is a flow chart of an example method 51 performed by an example vehicle vision system.

FIG. 6 is a flow chart of an example method 51 performed by the vehicle vision system. The method 51 includes a calibration that may be performed by calibration logic (52-59). Results of the calibration may be stored for subsequent use in generating images of a vehicle's surrounding, such as surround view images (60 and 61).

The method may begin with the calibration logic determining relative position and orientation between image sensors having overlapping FOVs (52). The relative position and orientation may respectively be determined for plural pairs of image sensors. For each pair of image sensors having overlapping FOVs, a first image captured by a first image sensor and a second image captured by a second image sensor may be evaluated by the calibration logic. The intrinsic parameters of the image sensors may also be determined.

Also, the relative position and orientation of image sensors that have non-overlapping FOVs are established by the calibration logic (53). The relative positions and orientations established for plural pairs of image sensors having overlapping FOVs may be used to establish the relative position and orientation of image sensors that have non-overlapping FOVs.

Further, the positions and orientations of the image sensors may be estimated with respect to a vehicle reference frame (54). A known position and orientation of one image sensor relative to the vehicle reference frame may be used by the calibration logic to determine the positions and orientations in the vehicle reference frame.

For a surround view system, the position and orientation of at least one image sensor may be determined using images captured by different pairs of image sensors. For example, in calibration, the position and orientation of the image sensor 12 of the vehicle vision system of FIGS. 1-3 may be determined using relative positions and orientations between the image sensors of the pair 41 and of the pair 42, or using relative positions and orientations between the image sensors of the pair 43 and of the pair 44.

The calibration logic may also determine whether the extrinsic parameters estimated at 54 are independent of the images evaluated to obtain the extrinsic parameters (55). This process may be performed selectively by the calibration logic for the position and orientation of an image sensor that has a non-overlapping FOV with respect to the reference image sensor.

Where the calibration logic determines that the position and orientation of an image sensor estimated using data from different pairs of image sensors differs by more than a threshold, the logic proceeds to adjusting the position and orientation of at least one of the image sensors (56). The logic then may revert to 55, and the consistency of the extrinsic parameters may be improved in an iterative manner by continually reverting to 55.

Where the calibration logic determined that the position and orientation of an image sensor estimated using data from different pairs of image sensors meets a consistency criterion, the logic proceeds to computing re-projections of the same plurality of objects captured by the different pairs of image sensors (57). The re-projections may be computed for a projection surface as described below with reference to FIG. 8, for example. Also, the re-projections may be computed using the extrinsic parameters estimated and/or adjusted.

The calibration logic may also compare the positions of points in the re-projections (58). The positions may be the positions of markings, such as corners of a checkerboard pattern, in the re-projection. For example, the positions of the re-projection computed for a first and second image sensor that has captured first and second image of the objects, respectively, are compared to each other by the calibration logic. Where the positions do not fulfill a given consistency criterion, such as a threshold difference, the method continues to 56. 55-58 may be repeated for adjustments to the extrinsic parameters of the vehicle vision system, such as parameters of the image sensors.

Where the calibration logic determines that the re-projections fulfill a predetermined consistency criterion, the logic may facilitate storing the determined extrinsic parameters of the vehicle vision system (59). Where intrinsic parameters of the various image sensors are also determined at 52, the intrinsic parameters may also be stored.

The image processing unit of the vehicle vision system may be configured to use subsequently the extrinsic and intrinsic parameters of the vehicle vision system. For example, when the vehicle vision system is subsequently used to output visually a section of a surround view to a user, the image processing unit may process images captured by the various image sensors and may compute the surround view using the extrinsic and intrinsic parameters. Further, the image processing unit may facilitate via or in combination with the calibration logic, the calibration mentioned above.

To output an image to the user, the image must first be captured by at least one of the image sensors (60), for example. Then a projection of the images onto a projection surface may be computed by the image processing unit (61), for example. The projection may be computed using the extrinsic parameters of the vehicle vision system and the intrinsic parameters of the image sensors, for example. An optical output device may be controlled to output a section of the projection to the user. A user via an input interface may select the section. 60 and 61 may be performed a repeatedly during use of the vehicle vision system, based on the parameters of the vision system determined and stored via at least the calibration logic, for example.

Figure 7:
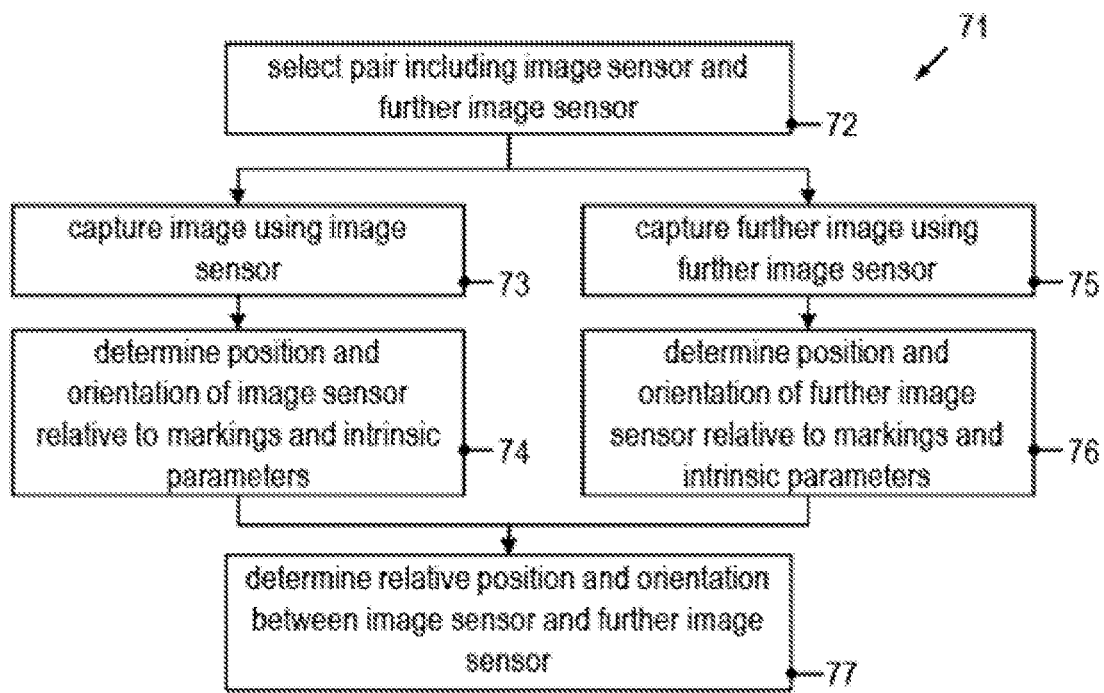
FIG. 7 is a flow chart of another example method 71 performed by an example vehicle vision system.

FIG. 7 is a flow chart of an example method 71 performed by the calibration logic, for example. The method 71 may establish the relative position and orientation between image sensors that have an overlapping FOV. The method 71, for example, may be performed to implement 52 of the method 51. The method 71 may also be performed by other aspects of the vehicle vision system alone or in combination with the calibration logic.

First, a pair of image sensors including a first image sensor and a second image sensor is selected (72). The pair is selected such that the image sensors have overlapping FOVs. A plurality of objects having predetermined positions relative to each other is positioned in the overlapping region of the FOV. The plurality of objects may include patterns or other markings arranged on three mutually orthogonal planes of a trihedron, for example.

Further, a first and second image is captured using the first and second image sensor, respectively (73 and 75, respectively), for example. Image processing is performed to determine image coordinates of the plurality of objects. For a checkerboard pattern, edge detections schemes may be used, for example. Also, position and orientation of the first and second image sensor relative to a coordinate system of the plurality of objects is determined (74 and 76, respectively). The intrinsic parameters of the first and second image sensor may be determined as well, for example. The intrinsic parameters may describe the non-linear distortions caused by the optical components of the first and second image sensor.

Furthermore, the relative position and orientation between the image sensor and the further image sensor are determined based on the results of 74 and 76.

Figure 8:
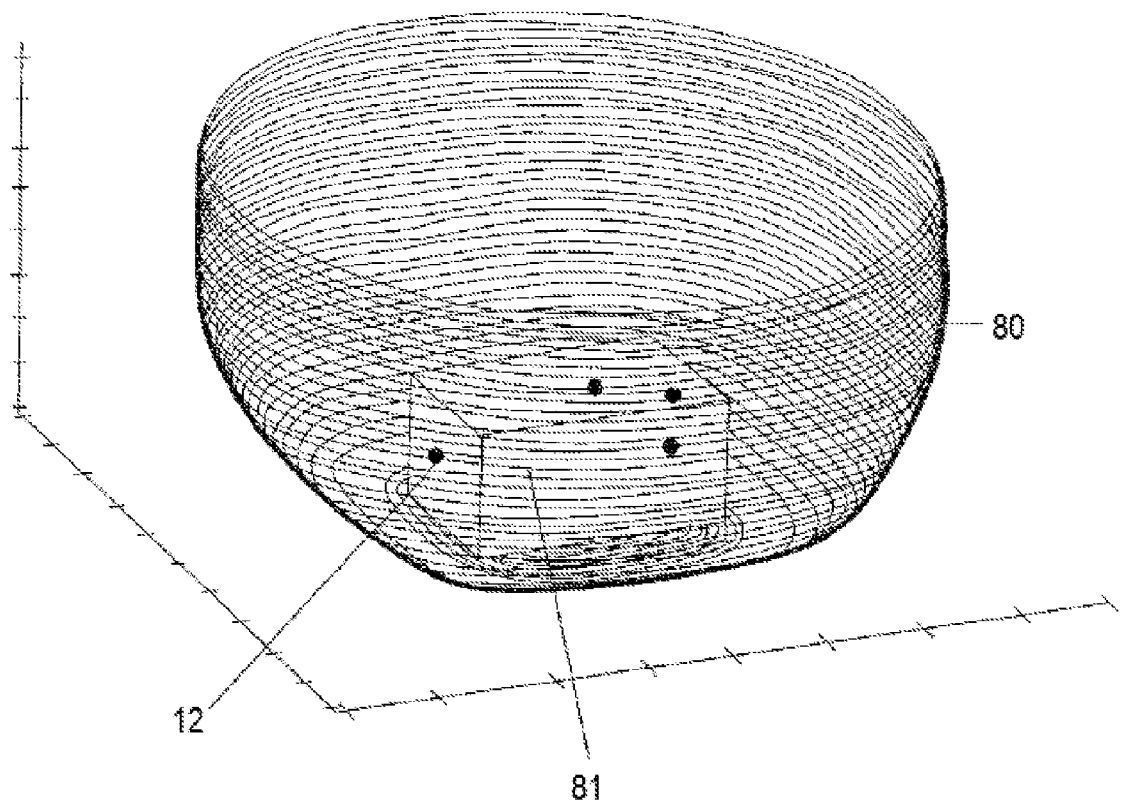
FIG. 8 is a schematic view of an example projection surface 80 that may be used both in calibration and when computing a view based on the results of the calibration.

FIG. 8 is a schematic view of an example projection surface 80 which may be used both in calibration and when computing a view based on the results of the calibration. Both in the calibration and when generating a view, such as a surround view, from images captured by different image sensors, the image processing unit 10 may compute a projection of images or sections thereof onto the projection surface 80, for example.

The fused images of a plurality of image sensors, such as a plurality of cameras may, be projected onto the projection surface 80. The projection surface 80 has a bowl-like shape. The projection surface 80 has a planar bottom, which may correspond to the ground plane of an object, such as the vehicle 1, for example. The planar bottom of the projection surface 80 may have a rectangular form. An aspect ratio of the planar bottom of the projection surface 80 may be selected based on a ratio related to the length and width of the object, such as the vehicle 1. In FIG. 8, a cuboid 81 represents the object. Circles (e.g., 12) represent the positions of image sensors on the object.

Using such a projection surface 80, points located in the object's surroundings may be correctly visualized in a view, such as a surround view, generated by an image processing unit. The shape of the projection surface 80 provides a visual perception for the user. Adequate in the sense that a user may not need to turn his or her head to view his or her surroundings.

For example, the projection surface 80 may have a flat bottom. Points located at ground plane level of the object may be projected onto the flat lower part of the projection surface 80. This may product the effect of points which are located on the ground plane level, such as road markings, will be correctly mapped.

Figure 9:
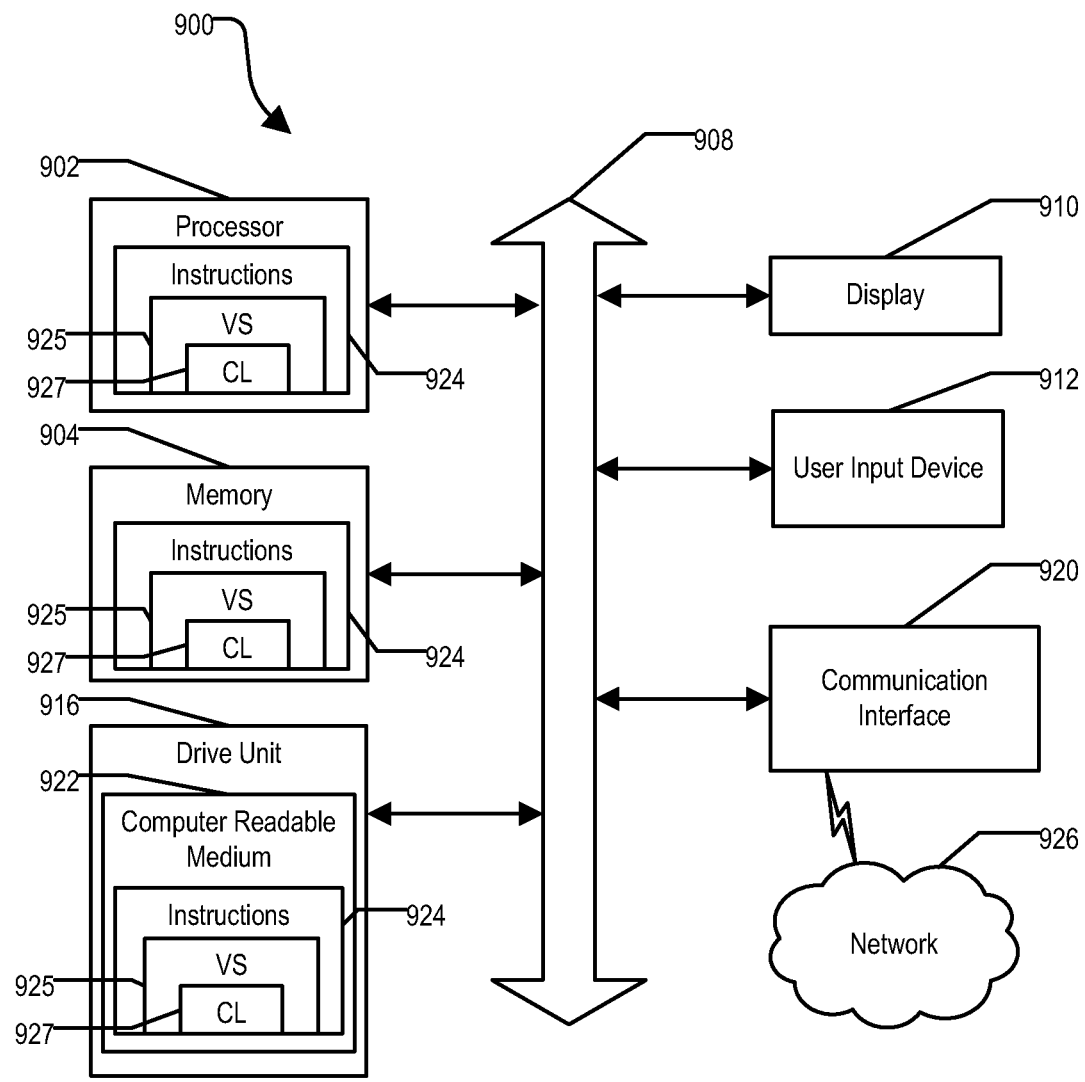
FIG. 9 is a block diagram of an example computer system 900 that may be a part of or coupled to an object (such as a vehicle), image sensors (such as cameras), calibration logic, or any other component of or related to an example vision system.

Furthermore, the object (such as a vehicle), the image sensors (such as cameras), the calibration logic, or any other component of or related to the vision system may be or may include a portion or all of one or more computing devices of various kinds, such as the computer system 900 in FIG. 9. The computer system 900 may include a set of instructions that can be executed to cause the computer system 900 to perform any one or more of the methods or computer based functions disclosed. The computer system 900 may operate as a standalone device or may be connected, e.g., using a network, to other computer systems or peripheral devices.

In a networked deployment, the computer system 900 may operate in the capacity of a server or as a client user computer in a server-client user network environment, as a peer computer system in a peer-to-peer (or distributed) network environment, or in various other ways. The computer system 900 can also be implemented as or incorporated into various devices, such as various types of vehicle computer systems (e.g., Electronic/Engine Control Module, Powertrain Control Module, Transmission Control Module, Brake Control Module), a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. The computer system 900 may be implemented using electronic devices that provide voice, audio, video or data communication. While a single computer system 900 is illustrated, the term "system" may include any collection of systems or subsystems that individually or jointly execute a set, or multiple sets, of instructions to perform one or more computer functions.

The computer system 900 may include a processor 902, such as a central processing unit (CPU), a graphics processing unit (GPU), or both. The processor 902 may be a component in a variety of systems. For example, the processor 902 may be part of a standard personal computer or a workstation. The processor 902 may be one or more general processors, digital signal processors, application specific integrated circuits, field programmable gate arrays, servers, networks, digital circuits, analog circuits, combinations thereof, or other now known or later developed devices for analyzing and processing data. The processor 902 may implement a software program, such as code generated manually or programmed.

The term "module" may be defined to include a number of executable modules. The modules may include software, hardware or some combination thereof executable by a processor, such as processor 902. Software modules may include instructions stored in memory, such as memory 904, or another memory device, that may be executable by the processor 902 or other processor. Hardware modules may include various devices, components, circuits, gates, circuit boards, and the like that are executable, directed, and/or controlled for performance by the processor 902.

The computer system 900 may include a memory 904, such as a memory 904 that can communicate via a bus 908. The memory 904 may be a main memory, a static memory, or a dynamic memory. The memory 904 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 904 includes a cache or random access memory for the processor 902. In alternative examples, the memory 904 may be separate from the processor 902, such as a cache memory of a processor, the system memory, or other memory. The memory 904 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 904 is operable to store instructions executable by the processor 902. The functions, acts or tasks illustrated in the figures or described may be performed by the programmed processor 902 executing the instructions stored in the memory 904. The functions, acts or tasks may be independent of the particular type of instructions set, storage media, processor or processing strategy and may be performed by software, hardware, integrated circuits, firm-ware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 900 may or may not further include a display unit 910, such as a liquid crystal display (LCD), an organic light emitting diode (OLED), a flat panel display, a solid state display, a cathode ray tube (CRT), a projector, a printer or other now known or later developed display device for outputting determined information. The display 910 may act as an interface for the user to see the functioning of the processor 902, or specifically as an interface with the software stored in the memory 904 or in the drive unit 916.

The computer system 900 may include an input device 912 configured to allow a user to interact with any of the components of system 900. The input device 912 may be a number pad, a keyboard, or a cursor control device, such as a mouse, or a joystick, touch screen display, remote control or any other device operative to interact with the computer system 900. A user of the calibration logic may input criteria or conditions to be considered by the logic, for example.

The computer system 900 may include a disk or optical drive unit 916. The disk drive unit 916 may include a computer-readable medium 922 in which one or more sets of instructions 924 or software can be embedded. The instructions 924 may embody one or more of the methods or logic described herein, such as calibration logic 927 of a vision system 925. The calibration logic 927 and the logic described above may include software, hardware, firmware, or a combination thereof. For example, the calibration logic may include or be a part of computer-readable medium. The instructions 924 may reside completely, or partially, within the memory 904 and/or within the processor 902 during execution by the computer system 900. The memory 904 and the processor 902 also may include computer-readable media as discussed above.

The computer system 900 may include computer-readable medium that includes instructions 924 or receives and executes instructions 924 responsive to a propagated signal so that a device connected to a network 926 can communicate voice, video, audio, images or any other data over the network 926. The instructions 924 may be transmitted or received over the network 926 via a communication port or interface 920, and/or using a bus 908. The communication port or interface 920 may be a part of the processor 902 or may be a separate component. The communication port 920 may be created in software or may be a physical connection in hardware. The communication port 920 may be configured to connect with a network 926, external media, the display 910, or any other components in system 900, or combinations thereof. The connection with the network 926 may be a physical connection, such as a wired Ethernet connection or may be established wirelessly as discussed later. The additional connections with other components of the system 900 may be physical connections or may be established wirelessly. The network 926 may alternatively be directly connected to the bus 908.

The network 926 may include wired networks, wireless networks, Ethernet AVB networks, or combinations thereof. The wireless network may be a cellular telephone network, an 802.11, 802.16, 802.20, 802.1Q or WiMax network. Further, the network 926 may be a public network, such as the Internet, a private network, such as an intranet, or combinations thereof, and may utilize a variety of networking protocols now available or later developed including, but not limited to TCP/IP based networking protocols. One or more components of the calibration logic may communicate with each other by or through the network 926.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 900 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. The computer system 900 encompasses software, firmware, and hardware implementations.

The system described may be implemented by software programs executable by a computer system. Implementations can include distributed processing, component/object distributed processing, and parallel processing. Alternatively, virtual computer system processing can be constructed to implement various parts of the system.

While various embodiments of the invention have been described, it will be apparent to those of ordinary skill in the art that many more embodiments and implementations are possible within the scope of the invention. Accordingly, the invention is not to be restricted except in light of the attached claims and their equivalents.

The invention claimed is:

1. A non-transitory computer-readable medium for calibrating a vision system of an object, configured to:
    receive, from a first image sensor of the vision system, a first image of a plurality of objects;
    receive, from a second image sensor of the vision system, a second image of the plurality of objects, where the plurality of objects is located in an overlapping region of a field of view of the first image sensor and a field of view of the second image sensor;
    determine a position and orientation of the first and the second image sensor relative to the plurality of objects based on the first and the second image, respectively, wherein determining the position and orientation of the first image sensor comprises determining a vector which comprises both a plurality of rotation parameters and a plurality of translation parameters of a camera matrix of the first image sensor, said vector being determined by solving a minimization problem under a constraint that a modulus of the vector which comprises both the plurality of rotation parameters and the plurality of translation parameters is fixed;
    determine a relative position and orientation between the first and the second image sensor based on a result of the determining a position and orientation of the first and the second image sensor;
    determine extrinsic parameters of the first and the second image sensor in a reference frame based on results of the determining a relative position and orientation between the first and the second image sensor;
    determine intrinsic parameters of the first and the second image sensor based on the first and the second image, respectively; and
    store the determined relative position and orientation between the first and the second image sensor and the determined intrinsic parameters for combining images captured by the vision system in performance of a driver assistance function.

2. The non-transitory computer-readable medium of claim 1, wherein the non-transitory computer-readable medium is further configured to:
repeat the receiving and determinations for a plurality of pairs of image sensors having overlapping fields of view.

3. The non-transitory computer-readable medium of claim 2, wherein a first pair of the plurality of pairs of image sensors includes a first pair image sensor and an intermediate image sensor, wherein a second pair of the plurality of pairs of image sensors includes the intermediate image sensor and a second pair image sensor, and wherein the non-transitory computer-readable medium is further configured to:
determine a relative position and orientation between the first pair image sensor and the second pair image sensor based on a result of the determining a relative position and orientation between the first and the second image sensor for the first pair and the second pair, respectively.

4. The non-transitory computer-readable medium of claim 3, wherein the non-transitory computer-readable medium is further configured to:
compare the relative position and orientation between the first pair image sensor and the second pair image sensor to the relative position and orientation between an other first pair image sensor and an other second pair image sensor of an other plurality of pairs of image sensors.

5. The non-transitory computer-readable medium of claim 3, wherein a field of view of the first pair image sensor and a field of view of the second pair image sensor are disjoint.

6. The non-transitory computer-readable medium of claim 3,
wherein the first pair image sensor and the second pair image sensor are provided at opposite sides of the object.

7. The non-transitory computer-readable medium of claim 1, wherein the object is a vehicle and the vision system is a vehicle vision system.

8. The non-transitory computer-readable medium of claim 1, wherein the determining a position and orientation of an image sensor comprises: determining the vector $\vec{M}$, wherein $\|L\vec{M}\|$ becomes a minimum under a constraint that the vector $\vec{M}$ comprises a fixed modulus, wherein L is a matrix having a number of columns that is equal to a number of rows of the vector $\vec{M}$, wherein $\|\ \|$ denotes a vector modulus function, and wherein the vector $\vec{M}$ comprises matrix elements that are elements of the camera matrix of the first image sensor.

9. The non-transitory computer-readable medium of claim 8, wherein the vector $\vec{M}$ is defined as $$\vec{M} = \begin{bmatrix} R_{11} \\ R_{12} \\ R_{21} \\ R_{22} \\ T_1 \\ T_2 \end{bmatrix}$$

and the camera matrix of the first image sensor is defined as $$H = \begin{bmatrix} R_{11} & R_{12} & R_{13} & T_1 \\ R_{21} & R_{22} & R_{23} & T_2 \\ R_{31} & R_{32} & R_{33} & T_3 \\ 0 & 0 & 0 & 1 \end{bmatrix};$$

where $R_{11}$, $R_{12}$, $R_{13}$, $R_{21}$, $R_{22}$, $R_{23}$, $R_{31}$, $R_{32}$, and $R_{33}$ denote rotation parameters of the camera matrix and $T_1$, $T_2$, and $T_3$ denote translation parameters of the camera matrix.

10. The non-transitory computer-readable medium of claim 8, wherein the vector $\vec{M}$ is independent of intrinsic parameters of the image sensor which define an image distortion.

11. The non-transitory computer-readable medium of claim 8, wherein the matrix L is independent of intrinsic parameters of the image sensor, the matrix L being dependent on coordinates of the plurality of objects and on coordinates of image points in the first image to which the plurality of objects are projected.

12. The non-transitory computer-readable medium of claim 1, wherein determining the extrinsic parameters in the reference frame comprises determining projections of the plurality of objects.

13. The non-transitory computer-readable medium of claim 7, wherein the vehicle vision system is a surround view system and the non-transitory computer-readable medium is further configured to: render a surround view based on the received images.

14. A method for calibrating a vision system of an object, comprising:
capturing, via a first image sensor of the vision system, a first image of a plurality of objects;
capturing, via a second image sensor of the vision system, a second image of the plurality of objects, where the plurality of objects is located in an overlapping region of a field of view of the first image sensor and a field of view of the second image sensor;
determining a position and orientation of the first and the second image sensor relative to the plurality of objects based on the first and the second captured image, respectively, wherein determining the position and orientation of the first image sensor comprises determining a vector which comprises both a plurality of rotation parameters and a plurality of translation parameters of a camera matrix of the first image sensor, said vector being determined by solving a minimization problem under a constraint that a modulus of the vector which comprises both the plurality of rotation parameters and the plurality of translation parameters is fixed;
determining a relative position and orientation between the first and the second image sensor based on a result of the determining a position and orientation of the first and the second image sensor;
determining a relative position and orientation between a first pair image sensor and a second pair image sensor based on a result of the determining a relative position and orientation between the first and the second image sensor for a first pair and a second pair, respectively, wherein the first pair of a plurality of pairs of image sensors includes the first pair image sensor and an intermediate image sensor, and wherein the second pair of the plurality of pairs of image sensors includes the intermediate image sensor and the second pair image sensor; and storing the determined relative position and relative orientation between the first and the second image sensor for combining images captured by the vision system in performance of a driver assistance function.

15. The method of claim 14, wherein the plurality of objects includes at least three objects located on a first plane and at least three objects located on a second plane.

16. The method of claim 15, wherein the plurality of objects includes at least three objects located on a third plane, and wherein the first plane, the second plane, and the third plane are orthogonal.

17. A vehicle vision system of a vehicle, comprising:
a plurality of image sensors each comprising an electro-optical component to capture images comprising a non-linear distortion, wherein the image sensors are located at different locations on the vehicle hosting the vehicle vision system;
an image processing unit configured to process image data captured by the plurality of image sensors; and
a calibration device, wherein the calibration device is coupled to the image processing unit, and wherein the calibration device is configured to:
identify, via a first image sensor of the vehicle vision system, a first image of a plurality of objects;
identify, via a second image sensor of the vehicle vision system, a second image of the plurality of objects, where the plurality of objects is located in an overlapping region of a field of view of the first image sensor and a field of view of the second image sensor;
determine a position and orientation of the first and the second image sensor relative to the plurality of objects based on the first and the second captured image, respectively, wherein determining the position and orientation of the first image sensor comprises determining a vector which comprises both a plurality of rotation parameters and a plurality of translation parameters of a camera matrix of the first image sensor, said vector being determined by solving a minimization problem under a constraint that a modulus of the vector which comprises both the plurality of rotation parameters and the plurality of translation parameters is fixed;
determine a relative position and orientation between the first and the second image sensor based on a result of the determining a position and orientation of the first and the second image sensor;
determine extrinsic parameters of the first and the second image sensor in a reference frame based on results of the determining a relative position and orientation between the first and the second image sensor;
determine intrinsic parameters of the first and the second image sensor based on the first and the second captured image, respectively; and
store the determined relative position and orientation between the first and the second image sensor and the determined intrinsic parameters for combining images captured by the vehicle vision system in performance of a driver assistance function.

18. The system of claim 17, wherein the system is a surround view system.

19. The system of claim 17, wherein the plurality of image sensors comprise fisheye lenses.

20. The system of claim 17, wherein at least two of the plurality of image sensors are located at two respective side door mirrors of the vehicle hosting the system.

21. The non-transitory computer-readable medium of claim 1, wherein the intrinsic parameters of the first and the second image sensor define a non-linear distortion.

22. The system of claim 17, wherein the intrinsic parameters of the first and the second image sensor define a non-linear distortion.

* * * * *